July 18, 1950     C. E. ROESSLER, JR     2,516,092
REBALANCING TELEMETERING SYSTEM
Filed March 2, 1948
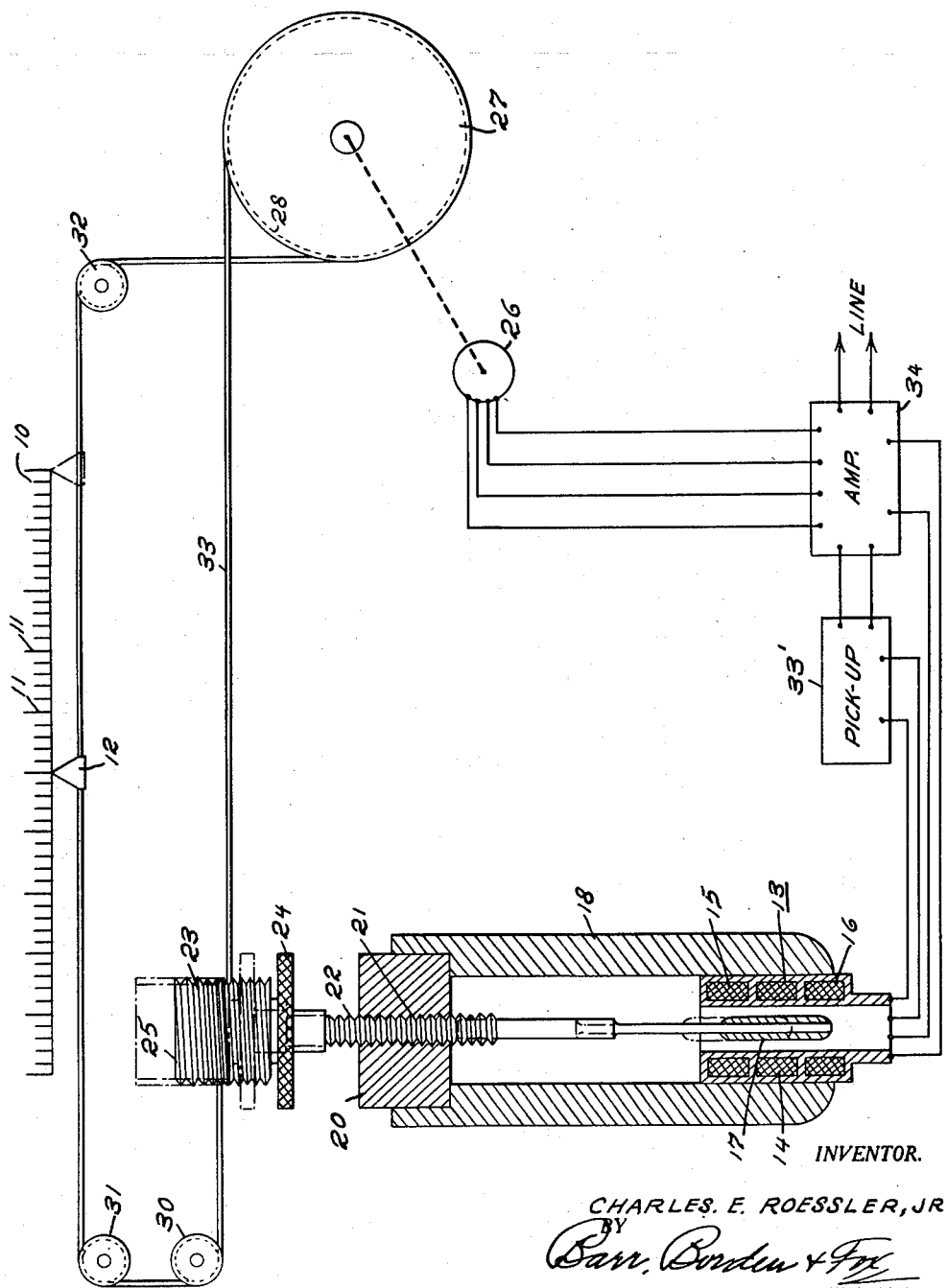
INVENTOR.
CHARLES. E. ROESSLER, JR.
ATTORNEY.

Patented July 18, 1950

2,516,092

UNITED STATES PATENT OFFICE 2,516,092

REBALANCING TELEMETERING SYSTEM

Charles E. Roessler, Jr., Philadelphia, Pa., assignor to Automatic Temperature Control Co., Inc., Philadelphia, Pa., a corporation of Pennsylvania Application March 2, 1948, Serial No. 12,497

2 Claims. (Cl. 177—351)

This invention relates to positioning mechanism for recorders, and particularly to recorders associated with differential transformers, the output of which varies by relative motions of an armature.

It is among the objects of the invention: to provide a recorder of improved accuracy; to provide a cable system of a recorder with a differential transformer having an armature movable by the cable system without varying the tension of the cable system; to improve differential transformers; to provide improvements in follow-up devices; and other objects and advantages will become more apparent as the description proceeds.

In the accompanying drawings, the single figure illustrates schematically the cable system of the recorder in its association with the differential transformer and with the circuit associated therewith.

The recorder provides a suitably fixed scale 10, having calibrations 11, disposed at any convenient point, and relative to which the recorder pointer 12 has adjustable positioning by means to be described. The calibrations 11 extend in opposite directions from an intermediate zero position to which the pointer is initially set, as shown in the drawing, ready to move to the right or to the left according to plus or minus changes of the condition being measured.

A differential transformer 13 is provided, preferably formed and functioning similar to that of the Hornfeck patent, No. 2,420,539, and characterized by the presence of an exciting primary coil 14, and series coupled opposed secondaries 15 and 16 as a stator unit. The outputs of the unit are in mutually bucking relation, and vary in voltage and phase on opposite sides of a null position, as the movable armature 17 moves axially of the coils through a null position of substantial symmetry of the armature relative to the coupled secondaries. Any other type of differential transformer can be used within the purview of this invention, as the important thing is that there be a relatively movable armature and series coupled bucking secondaries, the output of which is controlled by the relative position of the armature.

The transformer stator is suitably disposed in a housing 18, within which the stator may, if desired, be axially adjustable in order to help to predetermine the null position of the assembly. The upper end of the housing 18 is closed by the block 20, having the threaded bore 21.

A threaded shank 22 is adjustably positioned in the threaded bore 21, and at the lower end carries the armature core 17 in coaxial centered relation in the stator. At the upper end the threaded shank 22 carries an adjustable threaded screw, plug, or drum 23, preferably carrying the knurled flange 24 for purposes of preliminary adjustments of the armature in setting up the instrument. The outer surface of the plug 23 carries the helical thread 25 of preferably exactly the same pitch as that of the threaded shank 22 and the threaded bore 21.

A motor 26, preferably of the two-phase reversible type, is provided operatively coupled to drive, among other things, if desired, a main drum 27, having a peripheral cable-receiving groove 28. A plurality of idler pulleys are provided, as at 30, 31, and 32, and the cable 33 extends about drum 27, in the groove 28, in one course, and about the threaded plug 23, lying in the grooves of the thread and making one complete turn about the plug, then extends successively about idlers 30, 31, 32 and back to the drum 27. The pointer 12 is fixed to the cable 33 between idlers 31 and 32.

A suitable operating circuit is provided including a pick-up unit 33' and an amplifier unit 34. The pick-up unit 33', shown as a mere block, is arranged to develop a motor-running output as a result of a change of condition of a conditioned unit of any desired sort (not shown) with which the recorder is associated. This furnishes a voltage and phase output as a function of the unbalance of a differential transformer, similar to that shown in the figure, in response, illustratively, to pressure, flow, temperature, or other like condition change. Such output passes through the amplifier and starts the motor 26 to running in one direction or the other, which, at least, actuates the cable and thus moves the pointer 12 relative to the calibrations 11 on the scale 10. Of course, any movement of the cable effects rotation of the threaded drum 23 to move the armature in the proper direction relative to its stator to balance the previously existing output in the pick-up unit from the conditioned device, and thus stop the running input to the motor and the motor will thereupon stop, leaving the pointer 11 at a new designation comprising a function of the pick-up initial unbalance.

The important thing from the standpoint of this invention is that as the drum 23 is turned by the cable by reason of the threaded relation of shank 22 in bore 21, it moves axially of said bore and therefore transversely of cable 33. This would normally loosen or tighten the cable 33 if the latter were confined to a merely peripheral groove therein. However, in the instant case, owing to the fact that the drum 23 has a helical groove 25 of the same pitch as the threads on shank 22, the cable 33 remains axially stationary. This is because the groove, in effect, continues to remain axially stationary by continuous replacement by the helical "climb" of the thread coordinated with axial motion of the drum carrying the thread. This maintains the initial tension of the cable, regardless of the degrees of axial movement impressed upon the threaded shank 22 and upon actuating drum 23.

In circuit and pick-up input the invention herein is similar to the circuits illustrated, for instance, in Figs. 6 and 7, of Hornfeck Patent No. 2,420,539, to which reference may be made for any further explanation either of the circuit or of the differential transformers that may be necessary.

Having thus described my invention, I claim:

1. A recorder system comprising the combination of a scale graduated from an intermediate zero point for plus and minus readings respectively from said zero point, a pointer, an endless cable mounting said pointer for movement along said scale, a threaded drum having at least one convolution of said cable wound thereon, means for maintaining said cable under constant tension, said means including idle pulleys and a main driving drum, a reversible motor for actuating said drum, normally balanced electro-magnetic means proportionately responsive to a change of condition to actuate said motor for selective direction movement of said cable and to simultaneously rotate said threaded drum, whereby said pointer assumes an indicating position on said scale corresponding to said change, means actuated by said threaded drum movement to restore said electro-magnetic means to balanced condition to stop said motor, adn means for axially moving said threaded drum in synchronism with the progress of the cable convolution axially of said drum to maintain the same tension of said cable in all axially adjusted positions of said threaded drum.

2. A recorder system for operative association with a variable, comprising in combination a graduated scale, a pointer mounted for movement along said scale, rotary cable-guide means disposed adjacent to the ends of said scale in spaced relation, an effectively endless cable passing about said guide means having a first course thereof generally tangential to and continuous between certain of said guide means and having a second course attached to said pointer to move same, an externally threaded drum disposed in the space between said certain of the respective guide means with its axis normal to and intersecting the first course, said first course passing about said externally threaded drum and in opposite directions therefrom in passing tangentially about the respective guide means in fixed spatial disposition, said cable having an initial tension such as to establish frictional engagement with the guides and said threaded drum, a reversible motor for driving one of said rotary cable-guide means to move the pointer relative to said scale while rotating the drum, a control circuit, signal means in the circuit responsive to a change in condition of the associated variable to unbalance the circuit and actuate the motor proportionally to and in a direction according to the sense of the signal from said variable to move the pointer, electro-magnetic means in said circuit having a signal output normally balanced against the signal from said variable, means actuated by rotation of said threaded drum to generate a changed signal from said electro-magnetic means to balance the instantaneous signal from the signal means in the circuit to again restore said circuit to a balanced condition and stop the running of the motor, and means coordinated with the threads of said drum for moving said drum axially as it rotates in order to maintain the initial tension on the cable and the spatial disposition of the said first course in all axial dispositions of said drum.

CHARLES E. ROESSLER, Jr.

REFERENCES CITED

The following references are of record in the file of this patent:

UNITED STATES PATENTS

| Number | Name | Date |
|---|---|---|
| 1,930,353 | Doyle | Oct. 10, 1933 |
| 2,220,863 | Schuck | May 14, 1940 |
| 2,370,714 | Carlson | Mar. 6, 1945 |
| 2,420,539 | Hornfeck | May 13, 1947 |

OTHER REFERENCES

"Impedance Bridge for Flow-Rate Metering", by Curran; pp. 106–108, Electronics, April 1947.